Oct. 22, 1968    L. J. PARKES    3,406,661
MOBILE SUSPENSORY APPARATUS FOR CRIPPLED HOUSEHOLD ANIMALS
Filed Jan. 17, 1967    2 Sheets-Sheet 2

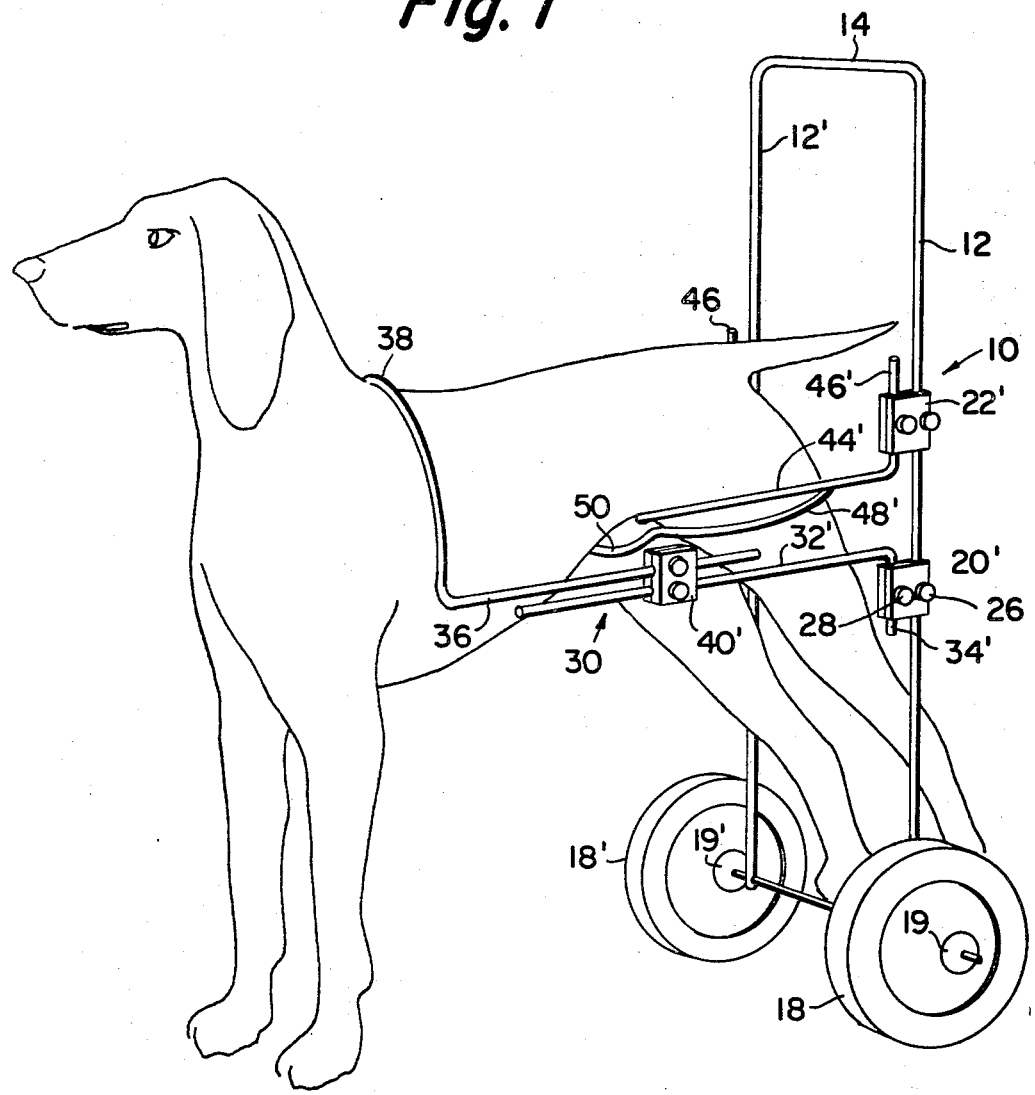

INVENTOR.
LINCOLN J. PARKES
BY *William H Bender*
ATTORNEY.

United States Patent Office 3,406,661
Patented Oct. 22, 1968

3,406,661
MOBILE SUSPENSORY APPARATUS FOR
CRIPPLED HOUSEHOLD ANIMALS
Lincoln J. Parkes, 706 Gulph Road,
Wayne, Pa. 19087
Filed Jan. 17, 1967, Ser. No. 609,898
6 Claims. (Cl. 119—1)

ABSTRACT OF THE DISCLOSURE

An apparatus having a standard formed of two wheels and a pair of spaced vertical shafts mounting upper and lower adjustable connectors which respectively receive longitudinally adjustable brace structure for the shoulder area and suspensory structure for the abdomen and hind quarters area of an animal.

This invention relates to wheeled supports for incapacitated animals and in particular is concerned with such apparatus which permits crippled household pets of the four legged variety to ambulate with relative ease during periods of temporary or permanent paralysis.

The present wheeled support has been developed particularly for household pets which are unable to move about due to injury. There is a high incidence of posterior paralysis in dogs resulting from spinal cord damage induced by such injuries as ruptured intervertebral discs and automobile accidents. The recovery period following these injuries is often prolonged or permanent. Inactivity in paralyzed animals leads to severe muscle atrophy of both affected and unaffected muscles with predisposition to infection of bladder, lungs and other systems.

The prior art of wheeled devices for assisting such incapacitated pets has, in my judgment, not been entirely satisfactory. In general this has been for the reasons that large and unsatisfactory portions of the animals' body have been used by the device in supporting it. As a result these prior devices did not contribute the strength necessary for stable ambulation, and created a condition of uncleanliness.

According to my invention, the brace structure for the shoulder zones of the animal and the suspensory or supporting structure for the abdomen and hind quarters are formed of lightweight tubular units. These units are fashioned in a manner to cooperate in maintaining an animal ambulatory and, additionally, provide for ready adjustment to insure proper weight balance of the animal and its resultant comfort during use of the apparatus.

For a better understanding of the invention reference should be made to the accompanying drawing wherein, FIGURE 1 is a view of the apparatus of the invention applied to an animal in position of use.

Referring to FIGURE 1, 10 generally indicates a standard which is formed of upright shafts 12–12' connected together at their upper ends by a cross arm 14 which conveniently provides a handle for guiding the apparatus, and a transverse axle 16 which mounts spaced wheels 18–18'. The upright shafts 12–12' are apertured adjacent their lower ends to rotatably receive the axle 16. The wheels 18–18' are mounted in suitable bearings indicated at 19–19' but not shown in detail.

Figure 3:
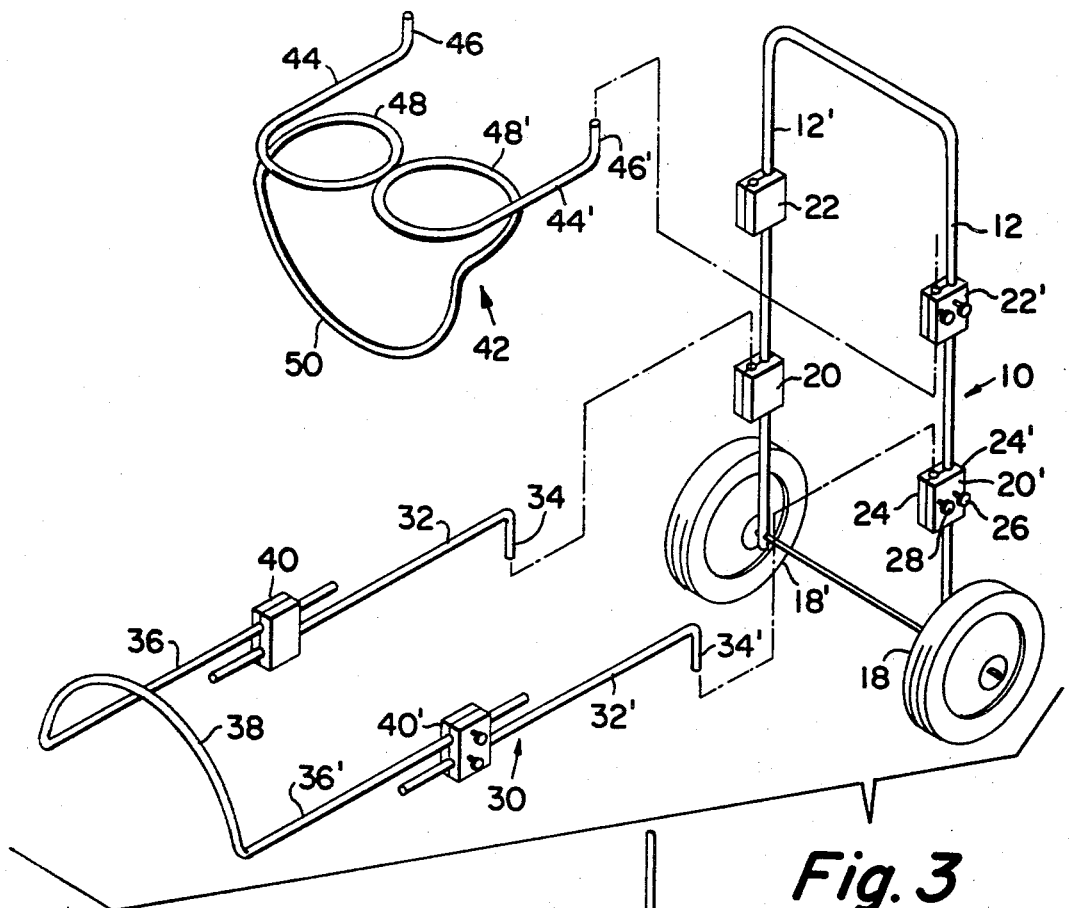
FIGURE 3 is a view showing the elements of the apparatus in perspective and in exploded relation.
Figure 2:
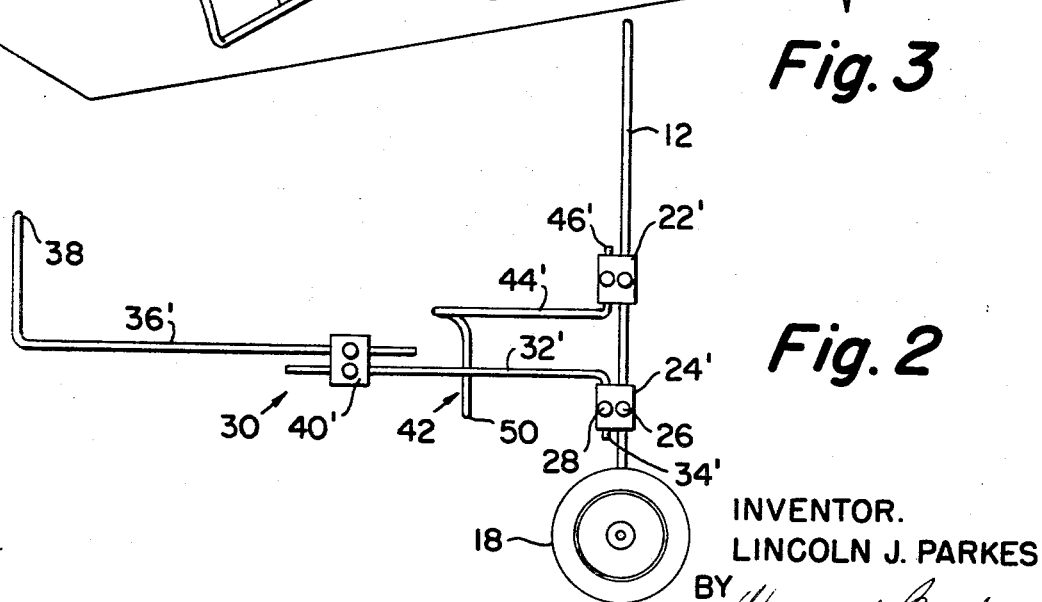
FIGURE 2 is a view in side elevation of the apparatus.

The upright shafts 12–12', as shown particularly in FIGURE 3, have lower clamps 20–20' and upper clamps 22–22' which function to permit adjustment along the shafts 12–12' and additionally function to receive other shaft elements to permit their adjustment. Each clamp as shown in connection with clamp 20' in FIGURE 3 is formed of two similar sections 24–24' which are adjustably fastened to shaft 12 by means of a set screw 26 and are provided with another set screw 28 for adjustably receiving another shaft element.

Each section 24–24' of the clamp is formed with two spaced arcuate grooves which are not identified but the grooves of one section mate with the grooves of the other section in order to receive, and clamp, a tubular element. As shown in connection with the lower clamp 20' of FIGURE 1, a second shaft or tubular element is received by the clamp and forms part of the shoulder brace unit which is identified generally at 30. A number of clamps, similar to clamp 20' are used in assembling the apparatus and since they function as explained in connection with clamp 20' they will only be identified but not described in detail in order to eliminate unnecessary description.

The shoulder brace unit is indicated generally at 30 and is shown as a unitary structure in FIGURE 3. This brace structure is comprised of longitudinal rear shafts 32–32' which respectively have depending tang ends 34 and 34', and longitudinal shafts 36–36' which are interconnected by an upturned yoke 38. In FIGURE 1, the tang end 34' is shown received by the clamp 20' and adjustably secured by a set screw and it will be understood that the tang end 34 will be received in clamp 20 in a similar manner. Clamps 40–40' are respectively provided to interconnect shafts 32 and 36 and shafts 32' and 36' and to permit longitudinal adjustment of the yoke 38.

The suspensory unit for the abdomen and hind quarters of an animal is indicated generally at 42 and is constructed of a single tubular member which is formed to provide opposed longitudinal arms 44–44' having respective upright tang ends 46–46'. The longitudinal arms 44–44' are bent inwardly upon themselves to form respective ring or ovate loops 48–48' which merge with a depending sling. The upstanding tang ends are received in the upper clamps 22–22' as shown in FIGURE 1 in connection with the clamp 22'.

When the brace unit 30 and suspensory unit 42 are assembled to the wheeled standard 10 and an animal is received thereby, the standard 10 will acquire a generally vertical position while the brace and suspensory units will be generally horizontally positioned relative to the standard. Since both the units 30 and 42 are adjustable along the length of the shafts 12–12' and the unit 30 is also adjustable longitudinally, the yoke 38, the loops 48–48' and the sling 50 can be relatively positioned to permit an animal regardless of size or shape to be received in the most comfortable manner. It is to be noted particularly, that the loops 48–48' will embrace the hind legs of the animal and the sling 50 will in coaction therewith provide an uplift effect to support the hind quarters of the animal above the ground or floor surface. By proper adjustment of the yoke 38, a downward pressure can be applied to maintain the longitudinal shafts of the unit 30 generally horizontal to the shafts of the standard 10.

It is to be understood that the above described embodiment is only representative of the invention and that various other clamp structures may be used for adjustably assembling the various shafts which although shown as tubular may take other forms and be constructed of metal or other materials and that the scope of the invention is to be limited by the appended claims.

I claim:

1. Apparatus for suspending the hind quarters of a crippled household pet above a floor area and permitting the pet to become mobile which comprises:

a. a standard formed of spaced shafts interconnected adjacent their upper ends and rotatably mounting a wheeled axle adjacent their lower ends, b. an upper and a lower clamp device for each of said shafts providing a cooperating pair of upper clamp devices and a cooperating pair of lower clamp devices, c. each of said clamp devices being formed of generally similar sections having means for adjustably securing the sections to the shafts and other means for adjustably securing another shaft, d. a shoulder unit formed of spaced parallel shafts having an integrally formed front yoke for embracing the shoulder area and providing spaced rear ends, e. said spaced rear ends of the shoulder unit being adjustably secured in said cooperating pair of lower clamp devices, f. a suspensory unit formed of spaced parallel shafts having an integrally formed lower abdominal sling merging into a pair of rear leg loops providing spaced rear ends and, g. said spaced rear ends of the suspensory unit being adjustably secured in said cooperating pair of upper clamp devices.

2. Apparatus as in claim 1, further characterized by said pair of lower clamp devices and said upper pair of clamp devices permitting the respective adjustment of the shoulder unit and the suspensory unit relative to the height of a pet.

3. Apparatus as in claim 2, further characterized by each spaced parallel shaft of the shoulder unit being extensible to permit longitudinal adjustment of the front yoke in accordance with the length of a pet.

4. Apparatus as in claim 2, further characterized by each spaced parallel shaft of the shoulder unit being formed of a pair of sections interconnected by clamps to permit longitudinal adjustment of the front yoke in accordance with the length of a pet.

5. Apparatus as in claim 1, further characterized by said rear leg loops being disposed above the sling and in horizontal alignment with each other.

6. Apparatus as in claim 1, further characterized by the shafts of the suspensory unit being bent inwardly of their rear ends toward each other to form horizontally aligned loops and bent downwardly to provide a depending sling.

References Cited

UNITED STATES PATENTS

| | | | |
|---|---|---|---|
| 2,546,726 | 3/1951 | Creamer | 119—1 |
| 2,976,840 | 3/1961 | Hugus | 119—1 |
| 3,215,117 | 11/1965 | Short | 119—1 |
| 3,241,851 | 3/1966 | Dingbaum | 280—34 |

HUGH R. CHAMBLEE, *Primary Examiner.*